United States Patent [19]

Imanaga

[11] Patent Number: 5,777,453
[45] Date of Patent: Jul. 7, 1998

[54] METHOD AND APPARATUS FOR RECHARGING BATTERIES USING A STEP SHAPED VOLTAGE PULSE

[75] Inventor: Eisuke Imanaga, Tokyo, Japan

[73] Assignee: Kabushiki Kaisha JNT, Tokyo, Japan

[21] Appl. No.: 624,864

[22] Filed: Mar. 27, 1996

[30] Foreign Application Priority Data

Sep. 26, 1995 [JP] Japan ................................. 7-270654
Dec. 8, 1995 [JP] Japan ................................. 7-013968

[51] Int. Cl.⁶ ............................................. H01M 10/44
[52] U.S. Cl. ............................................. 320/22
[58] Field of Search ........................... 320/2, 5, 14, 15, 320/20, 21, 22, 25, 30, 39, 40

[56] References Cited

U.S. PATENT DOCUMENTS

| 4,403,182 | 9/1983 | Yett .................................. 320/2 |
| 4,766,361 | 8/1988 | Pusateri .............................. 320/2 |
| 4,873,479 | 10/1989 | Iimura et al. ...................... 320/2 |
| 5,307,000 | 4/1994 | Podrazhansky et al. ........ 320/14 |
| 5,408,170 | 4/1995 | Umetsu et al. .................... 320/39 |
| 5,461,298 | 10/1995 | Lara et al. ........................ 320/2 |
| 5,606,238 | 2/1997 | Spellman et al. ................. 320/2 |

*Primary Examiner*—Edward Tso
*Attorney, Agent, or Firm*—Joseph C. Mason, Jr.

[57] ABSTRACT

The present invention relates to a method of charging a battery, including applying a voltage pulse to a rechargeable battery, detecting a terminal voltage and a charging current, comparing detected results to known standards and continuing charging if necessary. A charging device having movable contact terminals is also disclosed.

9 Claims, 15 Drawing Sheets

C1~C4: ELECTRIC CELL
Q1: TEMPERATURE SENSOR
Q2: PROTECTOR

C1~C5: ELECTRIC CELL
Q1: TEMPERATURE SENSOR
Q2: PROTECTOR

|  |  | REQUIRED CHARGING TIME AFTER ABOUT 70% DISCHARGE | REQUIRED CHARGING TIME AFTER ABOUT 100% DISCHARGE |
|---|---|---|---|
| COMPARATIVE EXPERIMENTS | 1 | 1 HOUR AND 20 MINS TO 1 HOUR AND 40 MINS | 2 HOURS OR LONGER |
|  | 2 | ABOUT 1 HOUR AND 20 MINS | 1 HOUR AND 40 MINS OR LONGER |
| DEMONSTRATION EXPERIMENTS | 1 | ABOUT 20 MINS | ABOUT 20 MINS |
|  | 2 | ABOUT 15 MINS | ABOUT 20 MINS |

Fig. 7

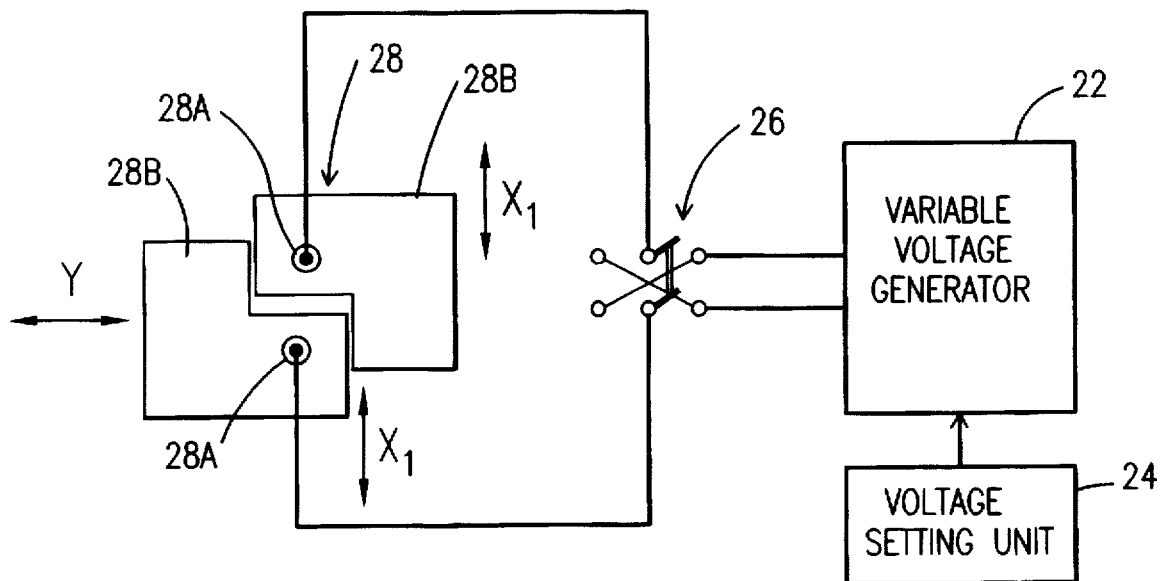
*Fig. 12*
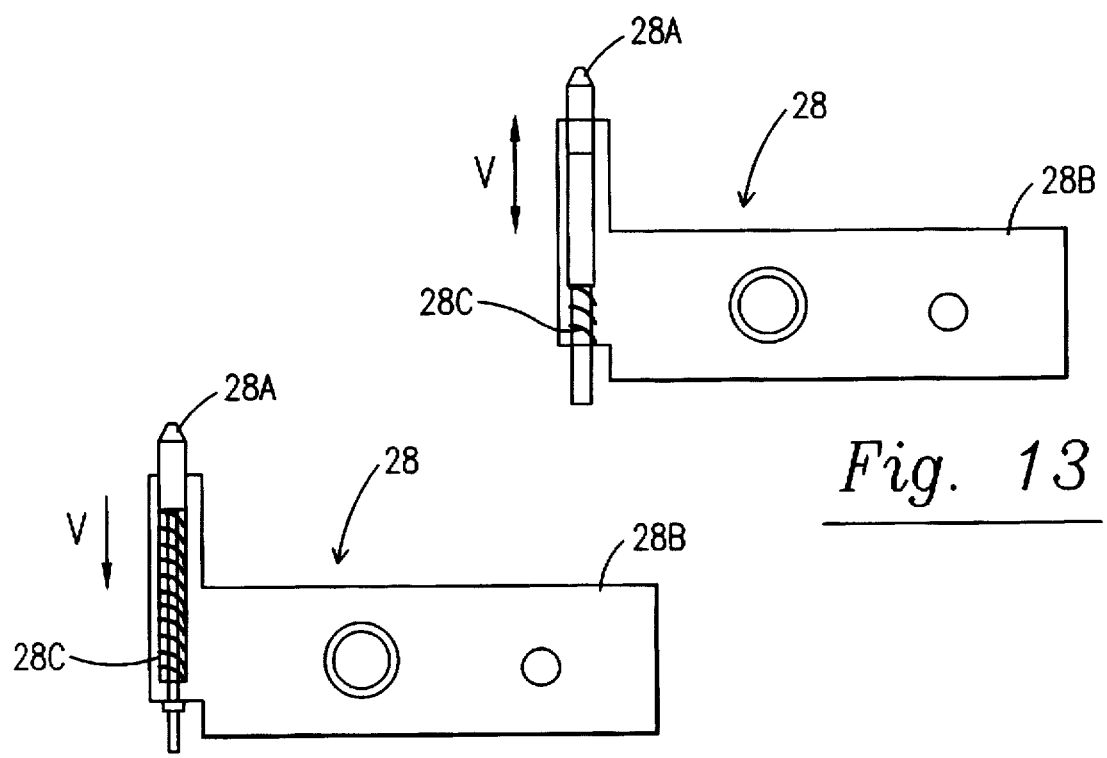
*Fig. 13*
*Fig. 14*

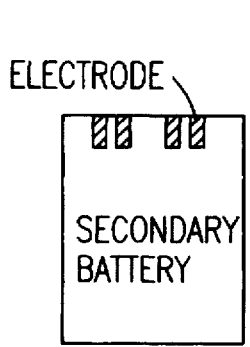
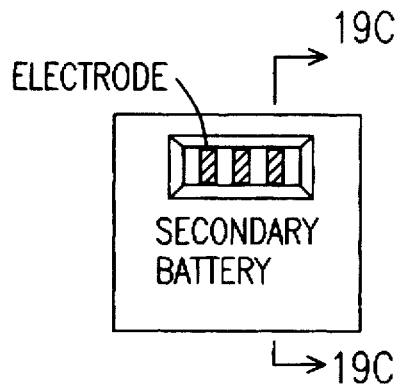
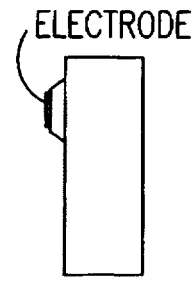
*Fig. 19A*  *Fig. 19B*  *Fig. 19C*
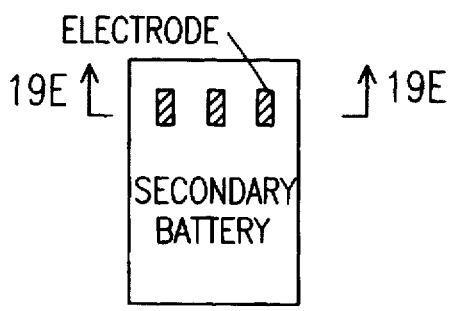
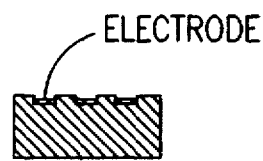
*Fig. 19D*  *Fig. 19E*
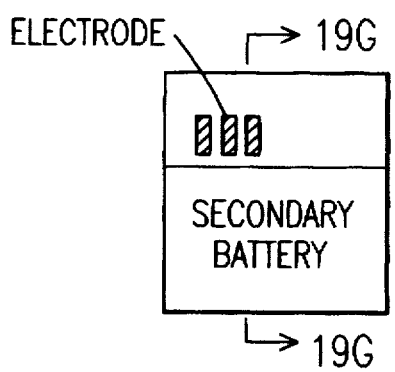
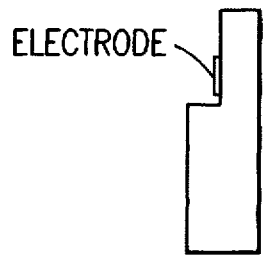
*Fig. 19F*  *Fig. 19G*

METHOD AND APPARATUS FOR RECHARGING BATTERIES USING A STEP SHAPED VOLTAGE PULSE

BACKGROUND OF THE INVENTION

1. Field of the Invention

The present invention relates to a novel method for rapidly charging secondary batteries and a charging device that performs the rapid charging method.

2. Related Arts

A variety of portable or transportable electric/electronic apparatuses, such as portable telephones, notebook computers and other information processors, handy terminals, video cameras, rechargeable electric tools, compact vacuum cleaners, electric carts, battery forklifts, and electric cars, are widely employed in many fields, and as a result, batteries that serve as power sources are indispensable. Of the batteries that are available for such use, there are primary batteries that can be used and discharged only once, and secondary batteries that can be repeatedly charged and discharged.

The primary batteries, such as manganese dry cell batteries and alkaline ($—MnO_2$) batteries, for which international standards have been established, are convenient and are widely used. But since these batteries are discarded once their power has been consumed, they are not economical.

Included in the group of secondary batteries, which can be charged and discharged many times, are the lead-acid batteries, long used with automobile engines, etc., whose continuing development has, over time, provided substantial improvements in battery size and capacity. But because these batteries are heavy, and because in them a dilute sulfuric acid solution is employed as an electrolyte, they are not appropriate as power sources for compact transportable devices, that is, for example, for portable devices. Although a compact, sealed lead-acid battery, a scaled down version of the traditional lead-acid battery, has been developed, as the power capacity to unit weight ratio is unfavorable, it is only occasionally used.

Currently, compact secondary batteries, including, among others, nickel-cadmium (Ni—Cd) batteries, nickel-hydrogen (NiMH) batteries, lithium ion (Li) batteries, are popular. Of these batteries, Ni—Cd batteries, which were first produced in the 1960's, hold a large share of the market. The features of a Ni—Cd battery are: (1) it is sealed and contains no liquid that must be supplemented; (2) it is light; (3) it can be made compactly and can be replaced by a manganese dry battery having a like standard potential; (4) it exhibits little voltage fluctuation and has a large current output; and (5), unlike a manganese dry battery, which is a primary battery, it can be used repeatedly, thus reducing the costs involved in its employment.

Although a Ni—Cd battery is a compact secondary battery that possesses many desirable features, according to the standard charging condition that battery makers recommend, charging of a battery should be performed for a period of 10 to 15 hours, with a current of only 0.1 C. Such a long charging time makes its use inconvenient, and offsets many of its favorable features.

For some batteries, the charging current is set to 0.3C to reduce the charging time. And there are other batteries for which rapid charging is possible that have reduced charging times of from 30 minutes to one hour. But such batteries must be especially designed. And also, when the charging time is reduced, the internal temperature of a battery is very high at the end of the charging period and the service life of a battery is thereby shortened.

A cumulative, so-called memory effect, which is induced in a secondary battery when it is not fully discharged before being recharged, permits only partial charging, and gradually reduces the available battery capacity until at last the battery is unusable. The subsequent disposal of the useless secondary battery constitutes a waste of resources, which, especially where the pollution of the soil with heavy metals is involved, is accompanied by the wholly undesirable accelerated destruction of the natural environment.

The memory effect that is induced in a secondary battery becomes clearly apparent when recharging is performed before the charge held by a battery is fully exhausted, i.e., so-called supplemental charging. For a secondary battery incorporated in a portable device, the memory effect is incurred when additional charging is performed before the battery is used again, or when supplemental charging is performed.

Normally, for the power sources of portable information processors and communication devices, such as handy terminals and portable telephones, because of the time that is required and the procedures that operators must perform, it is highly improbable that the charging of a secondary battery will be begun after the charge held by the battery has been fully exhausted.

For example, before a secondary battery that is incorporated in a portable telephone is charged prior to use, or before supplemental charging is begun when the battery is not to be used on a specific day, a user must each time check the remaining capacity and fully discharge the battery. For the user, this is an annoying and inconvenient requirement.

Therefore, additional charging or supplemental charging will be performed under conditions that ensure the occurrence of the memory effect.

An effective means by which to prevent the occurrence of the memory effect is the so-called refresh method, according to which standard charging is periodically performed each time the charge on a battery has been fully exhausted.

In FIG. 17 are shown voltage-to-capacity characteristics for a Ni—Cd battery and a NiMH battery when the memory effect is induced (solid line) and when the refresh method is performed (broken line). Although the refresh method is effective, care must be taken to avoid overdischarging when it is used, and this method is still complex because of the human effort and the time that is required.

Especially for a battery pack in which electric cells are connected in series and in parallel, the discharge conditions of the cells differ when an overdischarge occurs. In this case, a cell for which the discharging is first completed will be charged with the opposite polarity, and as a result can not be recovered. Special attention is therefore required to prevent overdischarging.

If the discharging at the refresh is set low in order to avoid overdischarging, because of the variances among the constituent cells, the discharging will be ended while one part or most of the cells are still not refreshed, and the true effect can not be obtained.

With the charging method that uses the conventional technique described above, there is also an accompanying difficulty that arises when charging that is being performed under satisfactory charging conditions is terminated. At present, the external determination of the charged condition of a compact secondary battery is not possible. It is, therefore, not easy to determine at what point a battery is satisfactorily and fully charged.

Well known methods that are employed for determining the point at which to terminate the charging of a secondary battery are: 1) a set charging time method; 2) a terminal voltage detection method; 3) a battery temperature detection method; and 4) a terminal voltage, minute change detection method.

According to 1), a set charging time method, the ON/OFF state of a charging circuit is controlled by a timer. Although this is the easiest method, the remaining battery capacity when the charging begins is not uniform. Even when charging is halted for a constant time, there is no assurance that the battery will be properly charged, and insufficient charging or overcharging frequently occurs.

According to 2), a terminal voltage detection method, charging is performed using a predetermined charging current, and the charging is halted when the terminal voltage of a secondary battery reaches a predetermined value, i.e., a value that is close to the maximum voltage value, in the last stage of the charging.

The voltage in the last stage of the charging is, however, affected and changed by the temperature induced by a charging current, and a voltage level for the detection of the end of the charging must be set low to avoid overcharging. Thus, the terminal voltage that is detected does not indicate the true charged state of the battery, and generally, the battery is insufficiently charged.

According to 3), a battery temperature detection method, the battery temperature is monitored by a temperature detection device that is incorporated in the battery, and the charging is halted when the internal battery temperature reaches a predetermined level. With this method, the heat that is detected is generated as the result of a reaction when gas that occurs at the last stage of the charging is absorbed by the anode. This method is easily affected by the ambient temperature, so that excessive charging tends to be performed when there is a low ambient temperature, while insufficient charging tends to be performed when there is a high ambient temperature. Essentially, since the rise in the temperature that is due to overcharging is detected, this often results in the deterioration of the battery.

According to 4), a terminal voltage, minute change (−ΔV) detection method, as is shown in FIG. 18, a slight reduction in a battery voltage at the last stage of charging, i.e., −ΔV, is detected, and charging is controlled by a microcomputer. The magnitude of the −ΔV change, however, varies depending on the temperature and the charging current. Especially at high temperature, the magnitude of a change is small and high detection accuracy is required. Since essentially the voltage change that occurs is also due to the rise in the temperature, a preferable result is not provided for the battery.

With the above described conventional charging methods, when insufficient charging is performed, a battery does not fully perform as intended, and this affects the performance of the device in which the battery is incorporated. Instead, when a secondary battery that has a closed structure is overcharged, the internal temperature of the battery is raised, and a leakage of electrolyte is induced that results in a shortage of electrolyte, i.e., a dry-up phenomenon, so that fatal damage may be caused to the secondary battery.

Secondary batteries vary in shape, size, voltage and available capacity, and accordingly, chargers having new shapes and structures that can accommodate such batteries are required. For example, a portable device produced at an early development stage and a portable device produced at a later development stage employ distinctly different batteries, and in most cases, the specifications for batteries is not standardized among makers. Rather, the employment of a compact, light battery having a large power capacity tends to be the prime selling point of a device that is produced at a later development stage, and a new charger that can accommodate that battery is required.

Under these circumstances, different batteries must be employed not only when a plurality of different portable telephone types are employed, but in an extreme case, also for an old type and for a new type. As is shown in FIGS. 19A through 19D, for example, the external shapes of batteries, the electrode positions, and the electrode intervals differ, and various types of chargers must be prepared for charging these batteries.

Specifically, the electrodes of one secondary battery are so provided that they project outward, away from the battery case, as is shown in the cross section taken along the B—B arrow line shown in FIG. 19B. While the electrodes of another secondary battery are located on the surface of a cut-away portion of the battery case, as is shown in the cross section taken along the D—D arrow line in FIG. 19D. A special contact portion must be provided with the charger for a secondary battery that has electrodes that are located in the above described positions; or otherwise, charging will not be ensured.

Also, as is shown in the cross section taken along the C—C arrow line in FIG. 19C, the electrodes of a secondary battery may be provided in recessed portions on a battery case, and a special contact portion is required with a charger for such a secondary battery.

SUMMARY OF THE INVENTION

It is therefore one object of the present invention to provide a secondary battery charging method by which steady, proper charging can be performed without causing a rise in temperature that will damage a secondary battery, and by which charging and discharging can be repeatedly performed without inducing memory effect.

It is another object of the present invention to provide a secondary battery charging device with which steady, proper charging can be performed without causing a rise in temperature that will damage a secondary battery, and with which charging and discharging can be repeatedly performed without inducing memory effect.

It is an additional object of the present invention to provide a secondary battery charging device, which has movable terminals, that can constantly and adequately charge secondary batteries that differ in shape, size, and voltage for a short time.

To achieve the above objects, according to the present invention, a second battery charging method comprises the steps of:

applying, to positive and negative terminals of a secondary battery, a voltage pulse having a step shape, whose voltage is reduced as time elapses and in consonance with a characteristic of the secondary battery, and supplying a corresponding current, with the voltage pulse having a pulse height of at least 1.3 times a pulse height of a terminal voltage for the secondary battery;

detecting the terminal voltage of the secondary battery during a pulse halted period and a charging current during a pulse duration;

comparing detected results with standard characteristic data concerning the secondary battery, and making a determination concerning a waveform for the voltage pulse and the pulse duration by employing results obtained from such comparisons;

continuing a charging process in consonance with results obtained by the determination; and performing rapid charging while preventing occurrence of overcharging, overheating, and memory effect in the secondary battery.

Further, to achieve the above objects, according to the present invention, a secondary battery charging device comprises:

a power source for generating a voltage to charge a secondary battery;

a power controller for controlling, upon receipt of the voltage from the power source, a pulse height and a pulse duration of an output voltage pulse in consonance with a control signal from an external source, and for generating the voltage pulse that has a height at least 1.3 times a pulse height of a terminal voltage for the secondary battery;

a monitoring unit for detecting a charging current during a charging period using the voltage pulse and the terminal voltage of the secondary battery during a voltage pulse halted period, and for monitoring a condition of the battery by comparing standard data for characteristics of the secondary battery with the charging current and the terminal voltage that are detected; and a calculation and driving unit for performing, upon receipt of an output by the monitoring unit, a predetermined calculation so as to match the characteristics of the battery, and for driving the power controller in consonance with results obtained by the predetermined calculation.

In addition, to achieve the above object, according to the present invention, a charging device for a secondary battery, which has movable contact terminals, comprises:

a variable voltage generator;

a voltage setting unit;

a polarity switching unit; and a terminal positioning unit for so moving and positioning the contact terminals that their positions correspond to positions of electrodes of the secondary battery.

According to the present invention, taking into consideration that the charging action for a battery is an endothermic reaction, a feature of the second battery charging method is that a large amount of current flows at the beginning so that the charging will be performed under a condition wherein the temperature will not rise.

Therefore, as it is possible to perform the charging in a short time and as the state of the battery is constantly monitored, an extreme rise in the temperature and overcharging will not occur and the service life of the battery can be extended.

Further, since the memory effect is not induced, even by relayed charging, in an emergency charging of a battery can be temporarily performed for a shorter period than the normal 15 to 20 minute charging time, e.g., for five minutes, and additional charging may be performed later.

The employment of the charging method of the present invention is not limited to compact and portable secondary batteries, and can be employed for large secondary batteries for transportation devices, such as battery powered forklifts and electric carts, and for the power source of an electric car. For an application for which currently charging must be performed for several hours during a non-operational period, such as during the night time, the charging time can also be reduced by a ratio of one to several greater numbers, and thus the method of the present invention apparently shows great merit.

Since with the present invention the service life of batteries can be considerably extended, resources can be efficiently used, and the number of batteries that must be disposed of can be reduced, the present invention can contribute to the preservation of the environment.

With the secondary battery charging device of the present invention that has movable terminals, the same charging device can be employed for charging secondary batteries that differ in shape, size, voltage and capacity. And as only one charging device will be required, for example, to charge, secondary batteries for portable devices that are manufactured differently and that have different arrangements. When a small entity user, such as a user in a home, employs a plurality of systems, he or she will need only one charging device to handle the charging for all the systems.

Such advantageous employment would also be possible in situations where there are multiple devices for a plurality of systems that use different batteries, as in companies, etc. For example, in an office where both portable telephones and handy terminals are used, only one charging device would be required for charging them, and as rapid charging using a high voltage pulse could be performed, savings both in time and in expenses could be realized.

BRIEF DESCRIPTION OF THE DRAWINGS

FIG. 7 is a table showing required charging times that were acquired as a result of comparison experiments and demonstration experiments conducted using the secondary battery charging method of the present invention;

FIG. 12 is a diagram showing the electric connection of the secondary battery charging device according to the present invention that has movable terminals;

FIG. 13 is a side view of an example structure for a terminal block of the secondary battery charging device according to the present invention that has movable terminals;

FIG. 14 is a side view of another example structure for a terminal block of the secondary battery charging device according to the present invention that has movable terminals;

FIGS. 19A through 19D are plan views and cross sectional views of the locations of electrodes on secondary batteries that are used for portable telephones and handy terminals.

DETAILED DESCRIPTION OF THE PREFERRED EMBODIMENTS

The present invention relates to a second battery charging method, which comprises the steps of: applying, to positive and negative terminals of a secondary battery, a voltage pulse having a step shape, whose voltage is reduced as time elapses and in consonance with a characteristic of the secondary battery, and supplying a corresponding current, with the voltage pulse having a pulse height of at least 1.3 times a pulse height of a terminal voltage for the secondary battery; detecting the terminal voltage of the secondary battery during a pulse halted period and a charging current during a pulse duration; comparing detected results with standard characteristic data concerning the secondary battery, and making a determination concerning a waveform for the voltage pulse and the pulse duration by employing results obtained from such comparisons; continuing a charging process in consonance with results obtained by the determination; and performing rapid charging while preventing occurrence of overcharging, overheating, and memory effect in the secondary battery.

Figure 1:
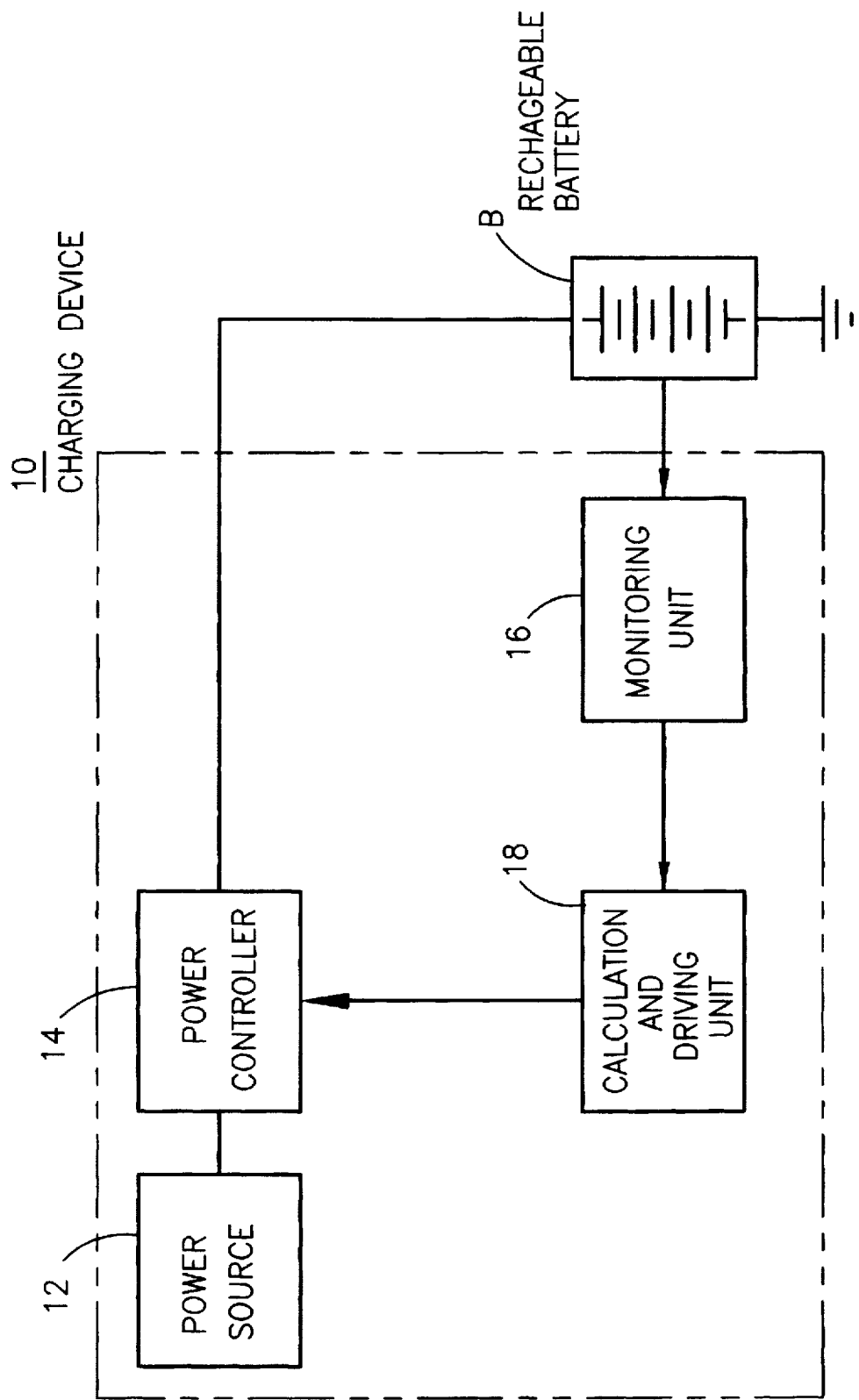
FIG. 1 is a block diagram illustrating the arrangement of a secondary battery charging device according to the present invention.

Further, the present invention relates to a secondary battery charging device, as is shown in FIG. 1, which comprises: a power source 12 for generating a voltage to charge a secondary battery; a power controller 14 for controlling, upon receipt of the voltage from the power source 12, a pulse height and a pulse duration of an output voltage pulse in consonance with a control signal from an external source, and for generating the voltage pulse that has a height at least 1.3 times a pulse height of a terminal voltage for the secondary battery; a monitoring unit 16 for detecting a charging current during a charging period using the voltage pulse and the terminal voltage of the secondary battery B during a voltage pulse halted period, and for monitoring a condition of the battery by comparing standard data for characteristics of the secondary battery with the charging current and the terminal voltage that are detected; and a calculation and driving unit 18 for performing, upon receipt of an output by the monitoring unit 16, a predetermined calculation so as to match the characteristics of the battery B, and for driving the power controller in consonance with results obtained by the predetermined calculation.

Figure 2:
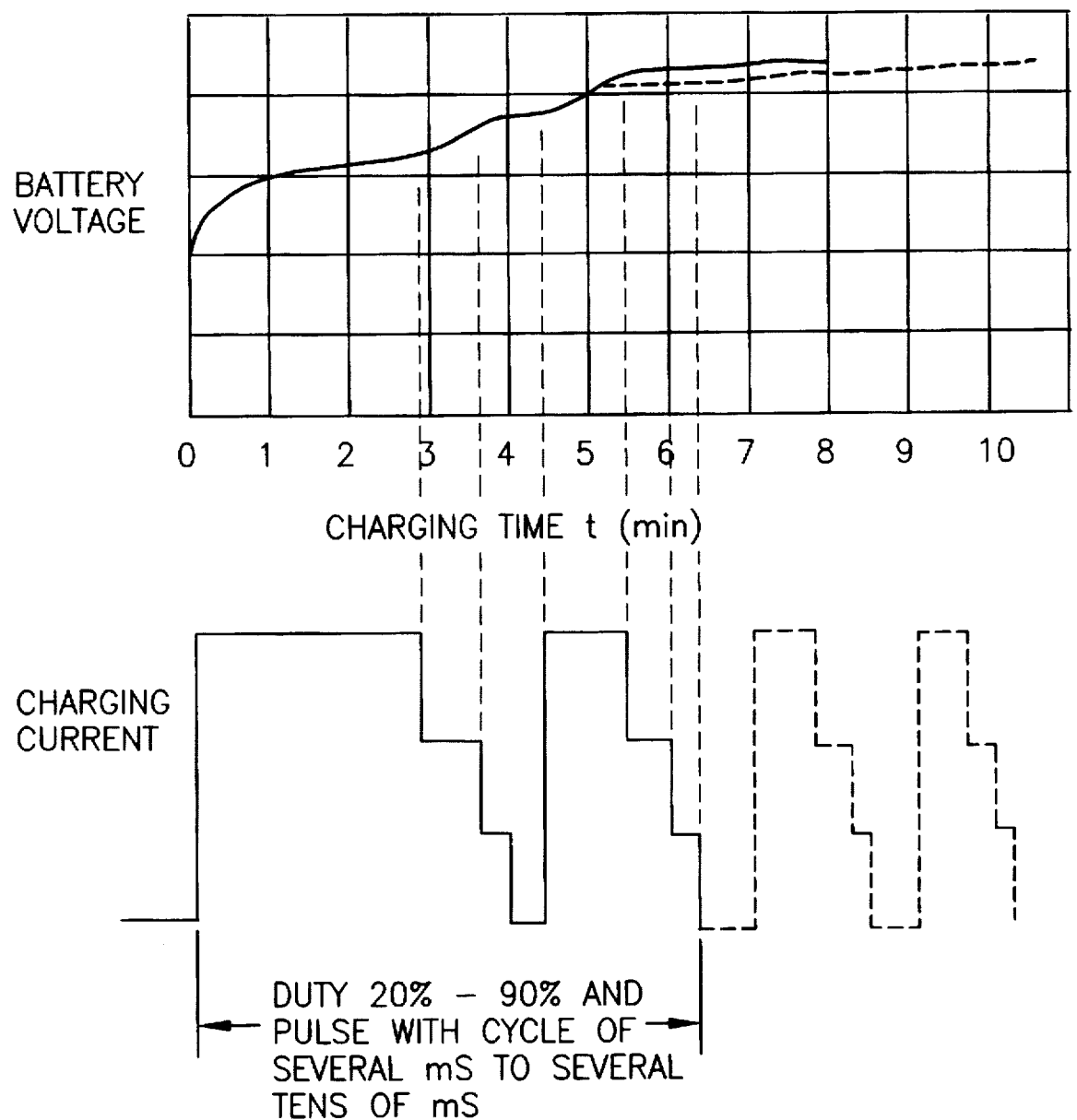
FIG. 2 is a graph for explaining the relationship between a current waveform and a battery voltage employed by a secondary battery charging method according to the present invention.

Monitored by the secondary battery charging method of the present invention are the status of the flow of a pulse charging current (see FIG. 2), which is generated by a voltage pulse that is at least 1.3 times a voltage that is applied to the positive and negative terminals of a secondary battery, and the terminal voltage of the secondary battery during a period when a voltage pulse is halted. Standard characteristic data for a target battery B, that are stored in advance in a monitoring unit 16, are referred to for the monitoring.

The remaining capacity of the battery B is measured by monitoring the initial status of the flow of the pulse charging current. The results obtained by the monitoring are compared with standard data that are determined by the battery type, and the results of the comparison are calculated. From the results obtained by the calculation result, data for an optimal value for a succeeding charging voltage pulse, i.e., the pulse shape and the pulse duration, are determined. As is specifically shown in the lower graph in FIG. 2, a charging current in this case is changed in consonance with the lapse of time and the rise in battery voltage.

In consonance with the optimal value data that are thus determined, the succeeding voltage pulse is generated and charging is continued with an optimal pulse shape and for an optimal duration. Therefore, rapid charging can be performed while overcharging, overheating, and the occurrence of the memory effect are prevented. When during the charging the monitoring unit detects a tendency of the temperature to rise, the duration of the voltage pulse for charging is shortened and the charging energy is reduced.

It is known that if a current suddenly flows across an Ni—Cd battery wherein the memory effect occurred, the deformation of the crystalline structure of an electrode, which causes the memory effect, will be removed and the memory effect will be eliminated. Such a sudden current flow may be either a forward (in a discharging direction) or a reverse (in a charging direction) flow. To accomplish this, there are methods whereby a capacitor that is charged by the above Ni—Cd battery is connected in the forward direction permitting the momentary flow of an overcurrent, and whereby a voltage pulse that is sufficiently higher than the terminal voltage of the above battery is applied in the reverse direction to supply a current. The latter method is utilized as a part of the charging process performed by the present invention to remove the memory effect, and is one of the effects that are provided by the charging method of the present invention.

Since the optimal voltage and current pattern for charging varies depending on the types and the capacities of secondary batteries, standard data for each battery type can be stored in a storage section in the monitoring unit and can be selected as needed for use.

As such a consideration is added, full charging, i.e., 100% charging, can be performed for the secondary battery, while during the charging, an excessive rise in the temperature and the memory effect do not occur. Therefore, the service life of a battery can be considerably extended, the effective use of resources can be realized, and damage to the environment can be limited.

The secondary batteries to be charged are nickel-cadmium batteries, nickel-hydrogen batteries, lead-acid batteries, nickel-zinc batteries, silver oxide-zinc batteries, silver oxide-cadmium batteries, and various types of lithium secondary batteries. The standard data for these secondary batteries are stored so that any type of secondary battery can be handled.

Figure 3:
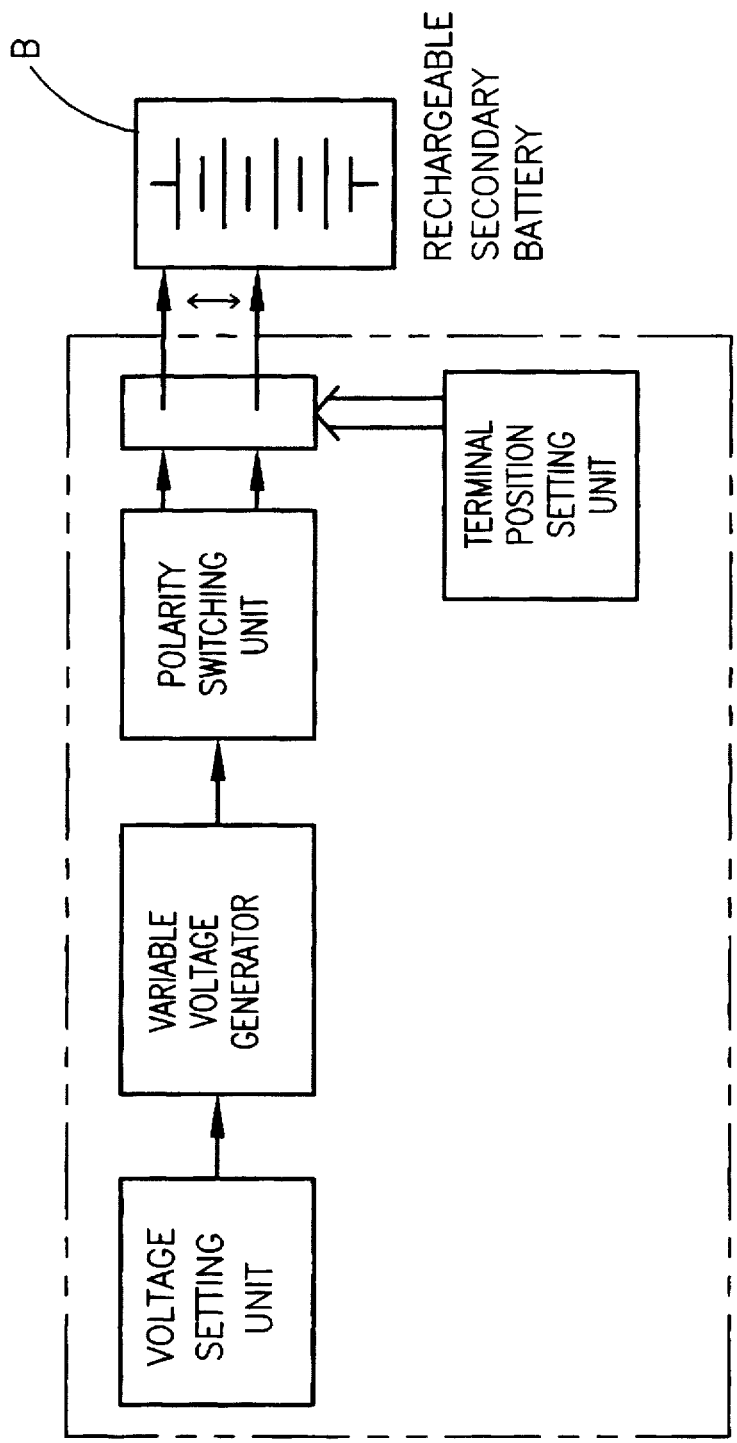
FIG. 3 is a block diagram illustrating the essential arrangement of a secondary battery charging device according to the present invention that has movable terminals.

As is shown in FIG. 3, the present invention relates to a secondary battery charging device, which has movable terminals, that comprises: a variable voltage generator 22; a voltage setting unit 24; a polarity switching unit 26; and a terminal position setting unit 30 for moving and positioning contact terminals so that they are adjacent to the electrodes of a secondary battery B.

The charging device can be made more useful by providing for the terminal position setting unit 30 to shift the contact terminals in several directions two-dimensionally, i.e., to the front and rear and to the right and left, in correspondence with the positioning of the electrodes of the secondary battery B.

The charging device can also be made more useful by providing for the terminal position setting unit 30 to shift the connection terminals in several directions three-dimensionally, i.e., to the front and rear, to the right and left, and up and down, in correspondence with the positioning of the electrodes of the secondary battery B.

In addition, the charging device can be made more useful by providing for the manual operation of the terminal position setting unit 30, so that the connection terminals can be shifted in several directions two-dimensionally or three-dimensionally, in correspondence with the positioning of the electrodes of the secondary battery B.

Moreover, the terminal position setting unit 30 has a storage section wherein characteristic data for the shape, structure, size, and voltage of the secondary battery B are stored in advance, and can, in consonance with the stored characteristic data, automatically shift the connection terminal in several directions two-dimensionally or three-dimensionally, in correspondence with the positioning of the electrodes of the secondary battery B.

Figure 4:
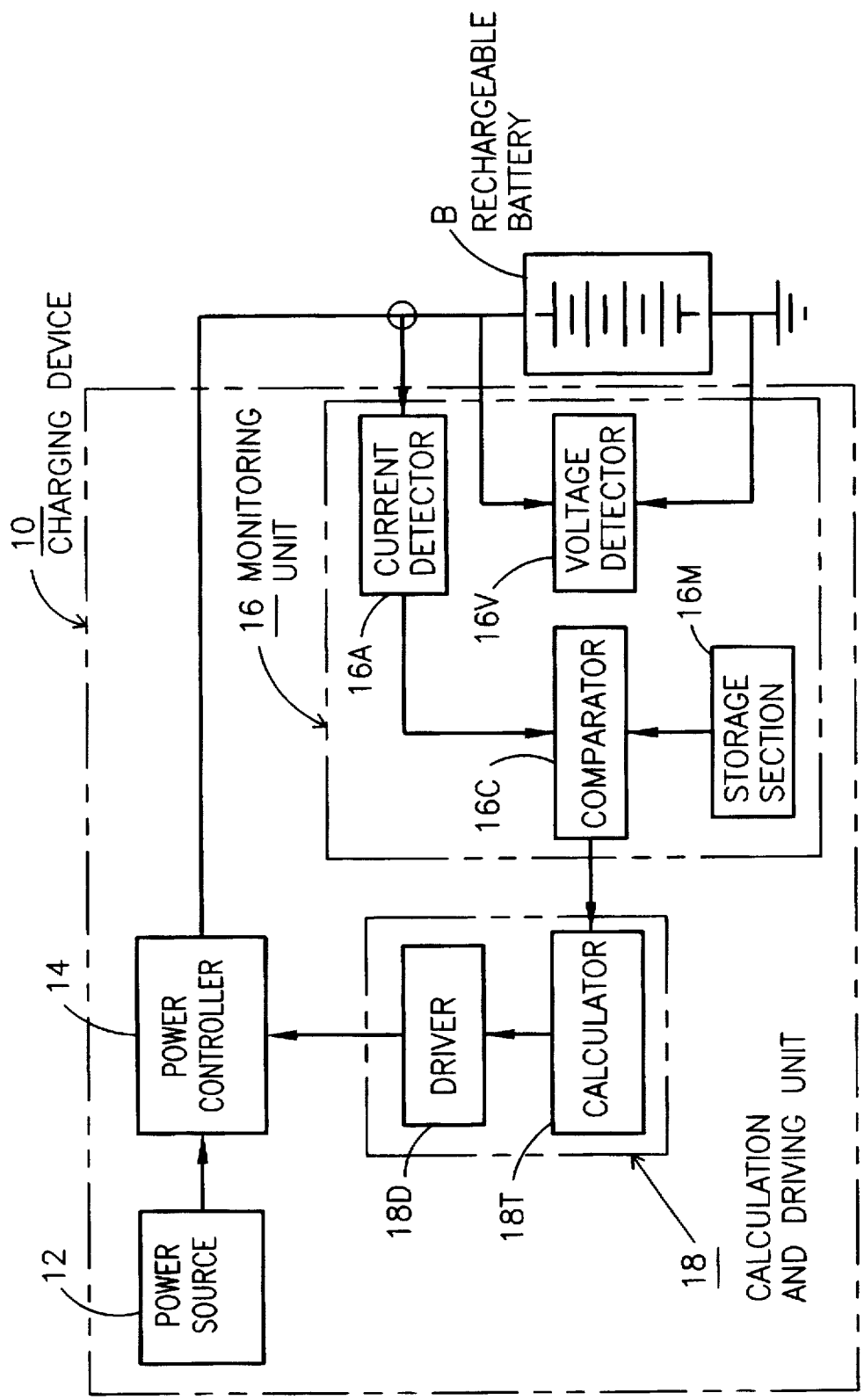
FIG. 4 is a block diagram illustrating the arrangement of a secondary battery charging device according to one embodiment of the present invention.

The preferred embodiments of the present invention will now be described while referring to the accompanying drawings. It should be here noted, however, that the present invention is not limited to these embodiments. FIG. 4 is a block diagram illustrating an example structure of a charging device that is adequate for performing a charging method according to the present invention and that corresponds to a secondary battery charging device 10 shown in FIG. 1. The same reference numbers as are used in FIG. 1 are used to denote corresponding or identical components.

In FIG. 4, among the essential components, the structures of the monitoring unit 16 and the calculation and driving unit 18 are specifically shown. The monitoring unit 16 has a voltage detector 16V, for detecting a terminal voltage of the battery B during a pulse halted period of an externally supplied voltage pulse, and a current detector 16A, for detecting a charging current during the active phase of a pulse. The monitoring unit 16 employs the detection results to fully determine the charging degree and the state of the battery B at that time.

The monitoring unit 16 also includes a storage section 16M wherein are stored standard characteristic data that are necessary for the execution of a series of charging operations. The standard characteristic data that are stored in the storage section 16M include a rated voltage current for the battery B, the transient time relationship between a pulse voltage, which is applied in consonance with a charging current capacity, and a charging current, and temperature characteristics.

In addition, the monitoring unit 16 includes a comparator 16C. The comparator 16C compares a voltage and a current that are detected by the voltage detector 16V and the current detector 16A with standard characteristic data that are stored in the storage section 16M, and generates a corresponding output.

The calculation and driving unit 18 has a calculator 18T and a driver 18D. The calculator 18T receives the output of the comparator 16C and calculates for the battery B an optimal voltage pulse duration and an optimal voltage pulse halt time during a charging period, i.e., a duty cycle and its pulse shape. The calculation and driving unit 18 transmits the results to the power controller 14 via the driver 18D. As a result, the power controller generates an optimal voltage pulse for the battery B.

The power source 12, as is described above, generates a DC voltage that is at least 1.3 times and at most 4 times higher than the terminal voltage of the battery B, but that preferably is 3.5 times or lower than the terminal voltage. The voltage generated by the power source 12 varies depending on the type of battery, the battery structure, and the battery capacity.

The power controller 14 that is controlled by the calculator and driving unit 18 converts a DC voltage into a voltage pulse for which the pulse height is at least 1.3 times that of the battery voltage. The pulse height is 1.3 to 4 times the terminal voltage of the battery, but preferably is 1.5 to 3.5 times as high, and even more preferably is 2 to 3 times as high.

In order to perform rapid charging of the secondary battery and to remove or to prevent the occurrence of the memory effect, it is important for the height of the voltage pulse to be so set that it is at least 1.3 times that of the terminal voltage of the battery.

However, since an over supply of the charging current to the secondary battery by the continuous application of such a high voltage for a long time can cause overheating of the battery and physical destruction of electrodes, in many cases such a process is inhibited while the battery is being serviced.

With the secondary battery charging method according to the present invention, a voltage pulse that is continued for minute periods is intermittently applied. Although this applied voltage is high, and is at least 1.3 times the terminal voltage of the battery, charging can be performed while the removal of an adverse effect is performed.

Since upon application of an extremely high voltage, even for a short time, the adverse affect on the secondary battery can not be avoided, the voltage pulse that is to be applied should at most be approximately 4 times the terminal voltage, but for practical use should be 3.5 times, and preferably about 3 times. This voltage range varies depending on the type of battery, the battery structure, and the battery capacity.

The battery types that are to be charged are nickel-cadmium batteries, nickel-hydrogen batteries, lead-acid batteries, nickel-zinc batteries, silver oxide-zinc batteries, silver oxide-cadmium batteries, and various types of lithium secondary batteries. As the data that are stored in the storage section 16M are altered according to the battery type, a more desirable charging procedure can be performed.

Disclosed below are the results of comparison experiments that employed the conventional charging method, and demonstration experiments for the present invention that employed the secondary battery charging method according to the present invention.

Comparison Experiment 1

Test secondary battery
 Ni—Cd battery, SH-700LBAT (product name: Mitsuboshi Co., Ltd.)

Voltage: 4.8 V

Number of cells: 4

Single battery external size: φ17×43

Figure 5:
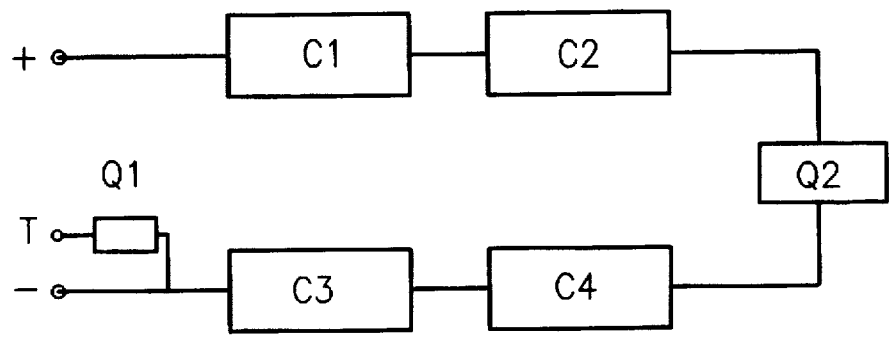
FIG. 5 is a block diagram illustrating the structure of a first secondary battery that was employed for an experiment conducted using the secondary battery charging method according to the present invention.

Circuit connection (see FIG. 5)

Test charging device:
 SRC-700 (product name: Mitsuboshi Co., Ltd.) (special adaptor attached)

Detection system for charging end time: −ΔV system

Comparison Experiment 2

Test secondary battery:
 Ni—Cd battery, SNN4132B (product name: Motorola Inc.)

Voltage: 6 V

Number of cells: 5

Single battery external size: 48 L×18 W×6.1 t

Figure 6:
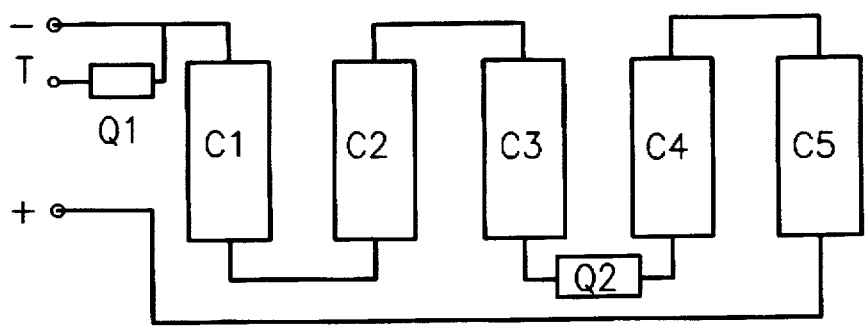
FIG. 6 is a block diagram illustrating the structure of a second secondary battery that was employed for an experiment conducted using the secondary battery charging method according to the present invention.

Circuit connection (see FIG. 6)

Test charging device:
 SLN9347B (product name: Motorola Inc.)
 (13-V power source connected)

Detection system for charging end time: −ΔV system

Demonstration Experiment 1

Test secondary battery:
 Ni—Cd battery, SH-700LBAT
 (product name: Mitsuboshi Co., Ltd.)

Test charging device:
 Present invention charging device (arranged as is shown in FIG. 4)
 Rated voltage: Use for 4.8 V battery
 Maximum charging current: Set to 2.5 A Demonstration Experiment 2

Test secondary battery:
 Ni—Cd battery, SNN4132B (product name: Motorola Inc.)

Test charging device:
 Present invention charging device (arranged as is shown in FIG. 4)
 Rated voltage: Use for 6 V battery
 Maximum charging current: Set to 2.5 A The required periods for charging which were obtained through the comparison experiments and the demonstration experiments are shown in the table in FIG. 7. As is apparent from the data provided in the table, the superiority of the charging method of the present invention was verified.

As is apparent from FIG. 7, the conventional secondary battery charging method required a charging period of at least one hour to charge a battery from which 70% of power was discharged.

In the other hand, the charging method of the present invention completed the charging within about 20 minutes, even though the maximum charging current was set to 2.5 A while taking the adverse affect on the battery into consideration. Since a charging current of higher than 2.5 A can be used by slightly altering the structure of the charging device, the required charging period can be shortened.

Figure 8:
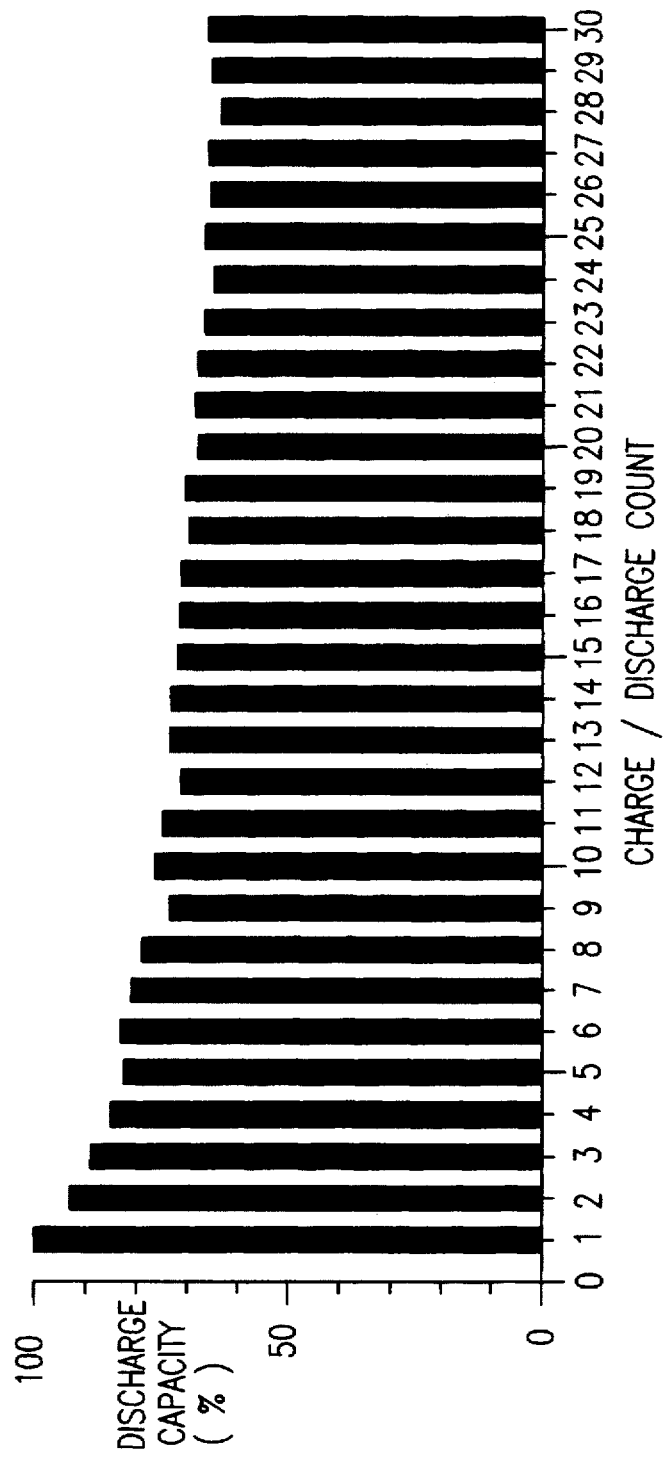
FIG. 8 is a bar graph showing an example of a charge and discharge cycle in prior art.
Figure 9:
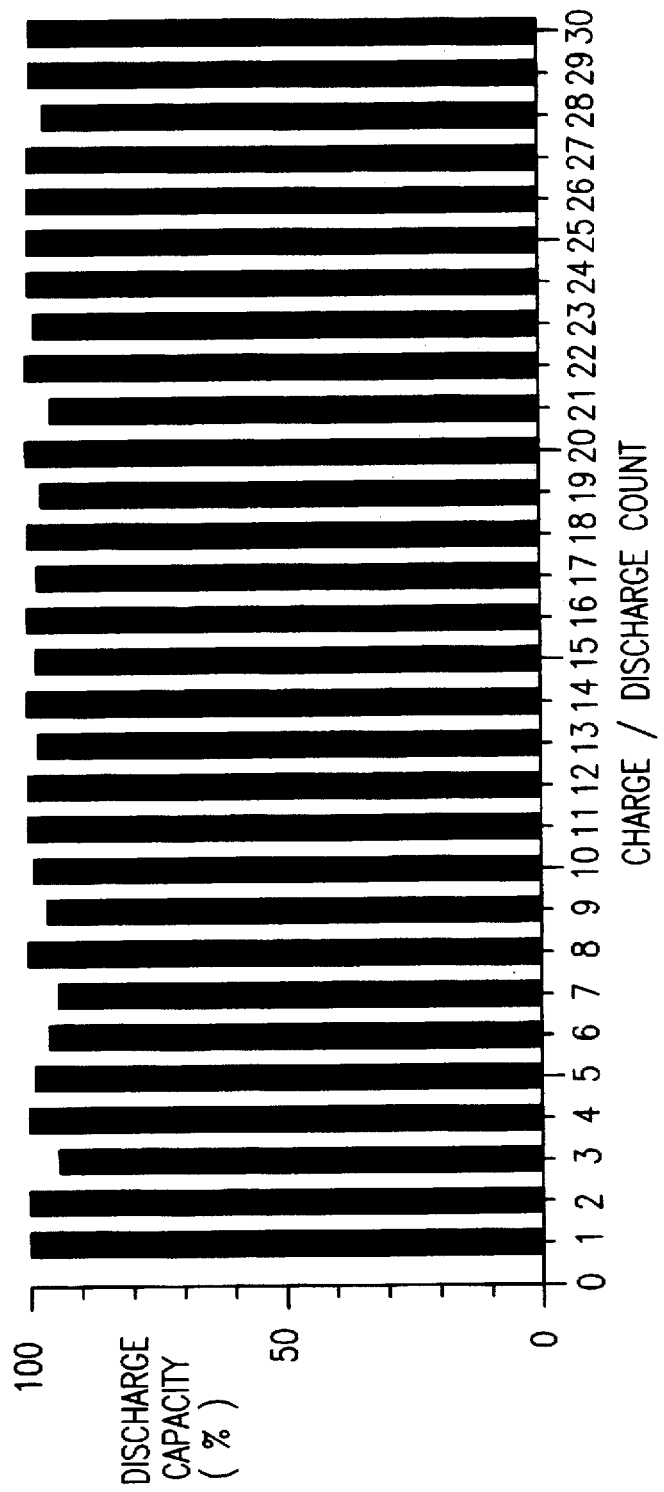
FIG. 9 is a bar graph showing an example of a charge and discharge cycle in the present invention.

In FIGS. 8 and 9 are shown the results provided by the observation of the repetitive charge/discharge characteristics, which were obtained by repeatedly performing the approximately 70% discharge and charge cycle with the arrangements used for the comparison experiment 1 and for the demonstration experiment 1.

As is apparent from FIG. 8, with the charging process that used the conventional technique, a substantial memory effect occurred within the first five or six 70% charge and discharge cycles, and the battery capacity was 64.2% when the 30 charge and discharge cycles were terminated. It was confirmed that this tendency was accelerated by repeating a shallower charge and discharge cycle.

On the contrary, referring to FIG. 9 in which are shown the results obtained during demonstration experiment 1 while using the charging method of the present invention, the changes in the battery capacities for the various cycles are only measurement errors. Of special note is the fact that the battery capacity was still almost 100% after the 30 charge and discharge cycles were terminated, and that it was verified that no memory effect occurred.

One embodiment of the present invention in FIG. 3 is illustrated in FIGS. 10 through 15. The same reference numbers as are used in FIG. 3 are used to denote corresponding or identical components.

Figure 10:
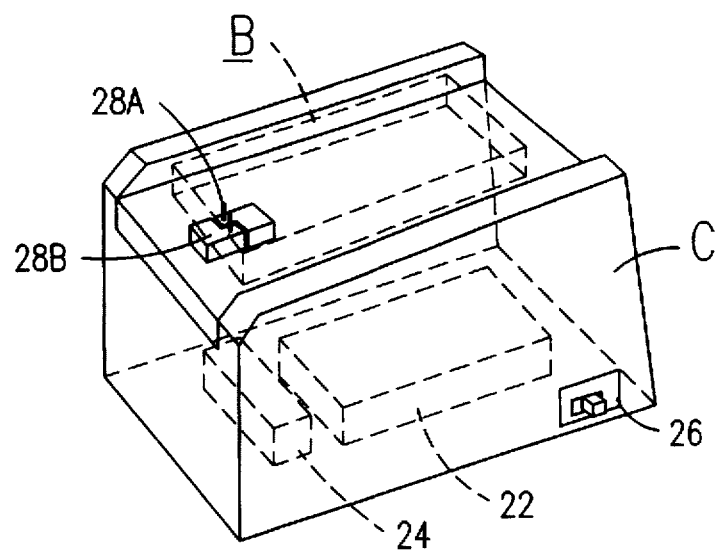
FIG. 10 is a diagram illustrating the outline of the secondary battery charging device according to one embodiment of the present invention that has movable terminals.
Figure 11:
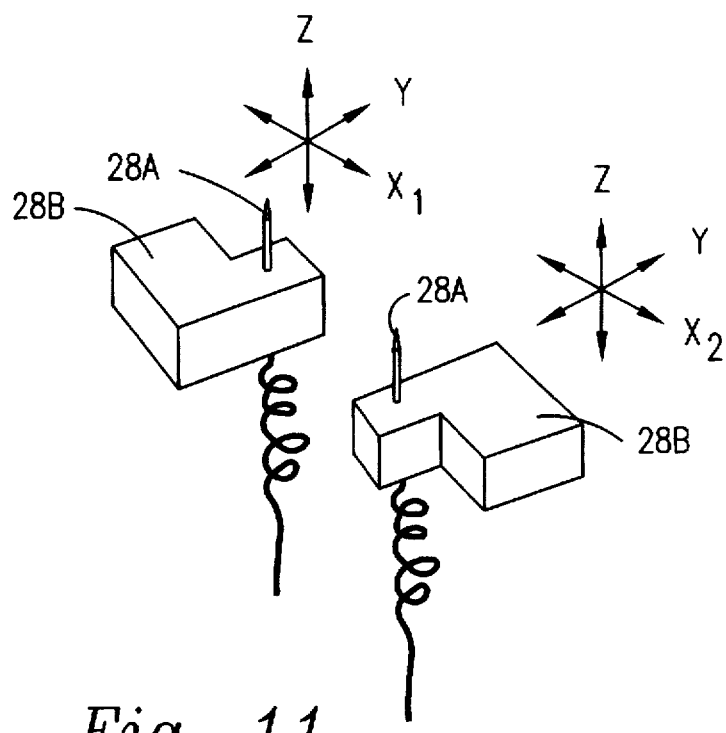
FIG. 11 is a diagram for explaining the direction of movement for a connection terminal block of the secondary battery charging device according to the present invention that has movable terminals.

In FIG. 10 is shown the external appearance of a secondary battery charging device according to the embodiment of the present invention that has movable terminals. FIG. 11 is a diagram for explaining the direction in which a connection terminal block is moved. FIG. 12 is a diagram illustrating the electric connections for the secondary battery charging device according to the present invention that has movable terminals.

As is shown in FIG. 10, a variable voltage generator 22 is incorporated in a case C. Upon receipt of power from an external commercially available power source (not shown), the variable voltage generator 22 generates a DC current, such as 4 V, 6 V, 8 V, . . . , or 25 V. This voltage is adjusted as needed in consonance with the characteristic of the secondary battery by a voltage setting section 24 that is operated manually or automatically.

A pair of connection terminal blocks 28 are provided on the top of the case C. As is shown in FIG. 12, the connection terminal blocks 28 are independently moved across the top of the case C in the directions indicated by double headed arrows $X_1$ and $X_2$, (to the right and left). Further, the connection terminal blocks can be shifted together in Y direction (to the front and rear) and in Z direction (up and down).

As a result, the interval between the connection terminal blocks 28, the interval between the end of the case C and the pair of connection terminal blocks 28, and the interval between the surface of the case C and the pair of connection terminal blocks 28, i.e., the interval between the electrode of the secondary battery that is mounted on the surface of the case C and the pair of connection terminal blocks 28, can be arbitrarily set.

Therefore, this arrangement can appropriately cope with the interval of the electrodes of the secondary battery, and the location of the electrodes of the secondary battery, i.e., the length from the end of the secondary battery to the position of the electrodes, and the depth below or the height above the surface of the secondary battery at which the electrodes are positioned.

It should be noted that a well known mechanism, such as a kinematic screw pair or cams, can be employed to move the connection terminals 28 in the directions indicated by the double headed arrows $X_1$ and $X_2$, and the Y direction and/or the Z direction shown in FIG. 11. The positions of the connection terminals 28 can be set not only manually but also automatically by providing known means, for example, a driving source such as a stepping motor or a solenoid, and a coupling mechanism such as a belt or gears.

Each of the terminal blocks 28 consists of a pin terminal 28A and a terminal holder 28B that holds the pin terminal 28A, as is shown in FIG. 13. The pin terminal 28A is pushed upward as needed by an elastic body 28C, such as a coil spring, and is moved up and down as is indicated by a double headed arrow V.

The location of the elastic body 28C is not limited to that shown in FIG. 13, and may be as is shown in FIG. 14.

The shapes of the pin terminals 28A and of the terminal blocks 28 are not limited to those shown in FIGS. 10 through 14, and may be cylindrical or columnar. Further, they can also have a square shape or an elliptical shape on which no protrusions are formed at the ends, or they can have various other shapes.

With this arrangement, the pin terminal 28A is moved in consonance with the movements of the terminal holder 28B in the directions indicated by the double headed arrows $X_1$ and $X_2$, and the Y direction or the Z direction. The positions in the X direction, and in the Y direction and/or the Z direction can be set in consonance with the positions of the positive and negative electrodes of the secondary battery B.

The pin terminal 28A is forced upward by the elastic body 28C, as is described above. Therefore, when the positive and negative electrodes of the secondary battery B are installed above, the pin terminal 28A presses the electrode upward so as to improve the contact between the electrode and the pin terminal 28A.

The provision of a battery press (not shown) on the outermost surface of the case C in FIG. 10 is a convenient means by which to prevent the secondary battery B from rising.

In addition to the above described V-directional movement of the pin terminal 28A by the elastic body 28C, a Z-directional movement mechanism that consists of screws or cams can be provided, so that a secondary battery that requires greater movement of the pin terminals 28A can also be charged.

Figure 15:
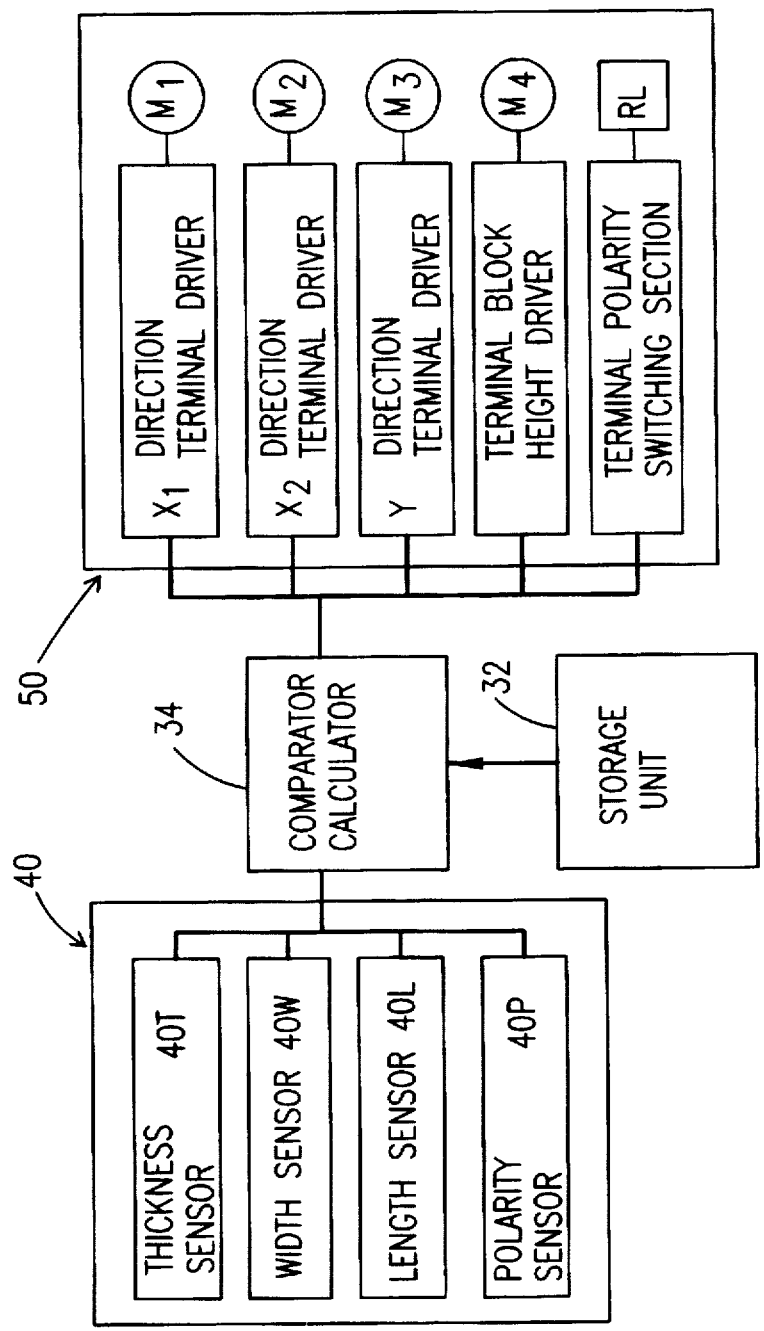
FIG. 15 is a block diagram showing an example structure wherein the secondary battery charging device according to the present invention that has movable terminals is automatically controlled.

FIG. 15 is a block diagram illustrating the general arrangement for automatically controlling the secondary battery charging device according to the present invention that has movable terminals. The secondary battery charging device that has movable terminals includes a storage unit 32, a comparator/calculator 34, a battery sensor unit 40, and a driving and setting unit 50.

The storage unit 32 is employed to store necessary data concerning the secondary battery, such as the size, the shape, and the voltage, and the positions of the battery electrodes. A preferable storage means is one in which, at the beginning, data that concern applicable secondary batteries are stored, and in which the data can be rewritten as needed in consonance with changes in the number of batteries that are to be charged.

The battery sensor unit 40 can include, for example, a thickness sensor 40T, a width sensor 40W, a length sensor 40L, an electrode sensor 40P, etc. If the charging device is limited to specific charging applications, for example, when the types of batteries to be charged are limited to a degree, some of the sensors can be omitted.

The driving and setting unit 50 incorporates motors $M_1$ and $M_2$ for moving the terminal holder 28B in the directions $X_1$ and $X_2$ so as to adjust the interval between the pin terminals 28A; a motor $M_3$ for moving the terminal blocks 28 in the Y direction; a motor $M_4$ for moving the terminal blocks 28 in the Z direction (in the direction of height); and a relay RL for switching a voltage polarity to corresponding mechanical sections and terminals.

The comparator/calculator 34 compares the data in the storage unit 32 with the output of the sensor unit 40 and perform calculations. In consonance with the results, the comparator/calculator 34 drives corresponding sections in the driving and setting section 50, and so performs setups for that section 50 that the positions of the terminal blocks 28 and the polarity of the output voltage match the characteristics of the battery to be charged. Although the operational condition of the driving and setting section 50 is managed precisely by a common feedback control, an explanation for that will not be given.

Figure 16:
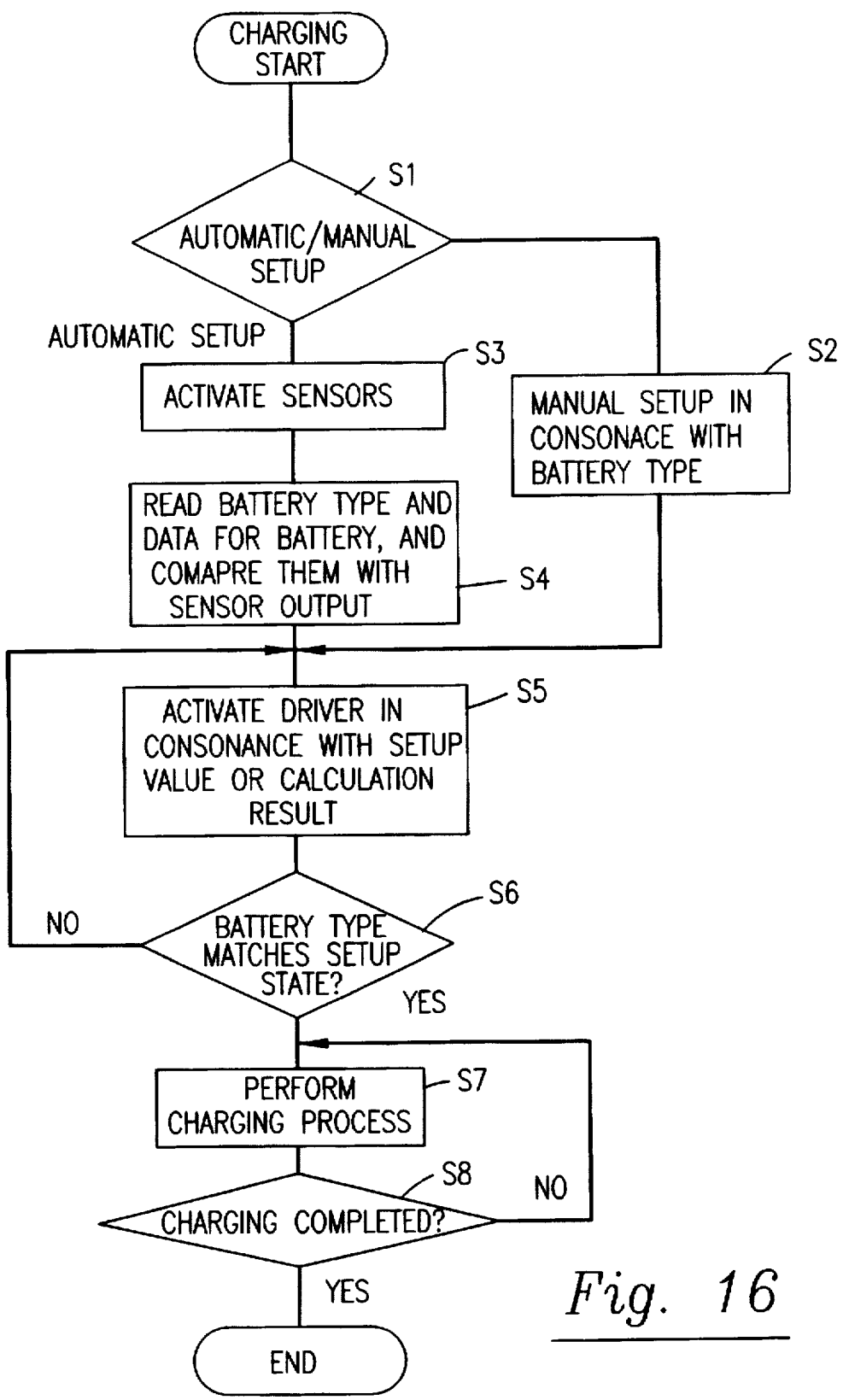
FIG. 16 is a flowchart showing the processing for the secondary battery charging device according to the embodiment of the present invention that has movable terminals.
Figures 17A, 17B:
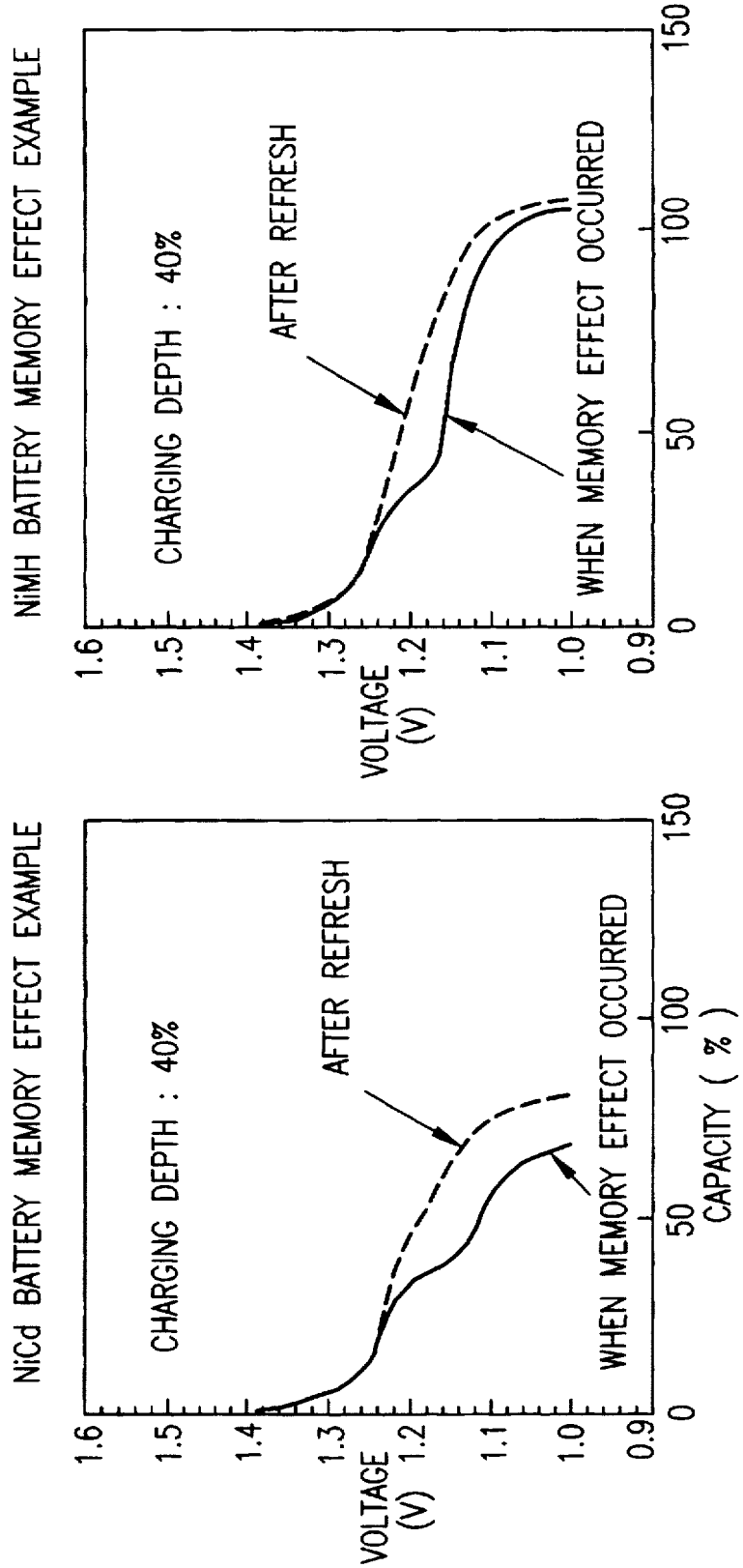
FIGS. 17A-B is a graph showing voltage-to-capacity curve examples of prior art memory effect occurrences and of refresh recovery states.
Figure 18:
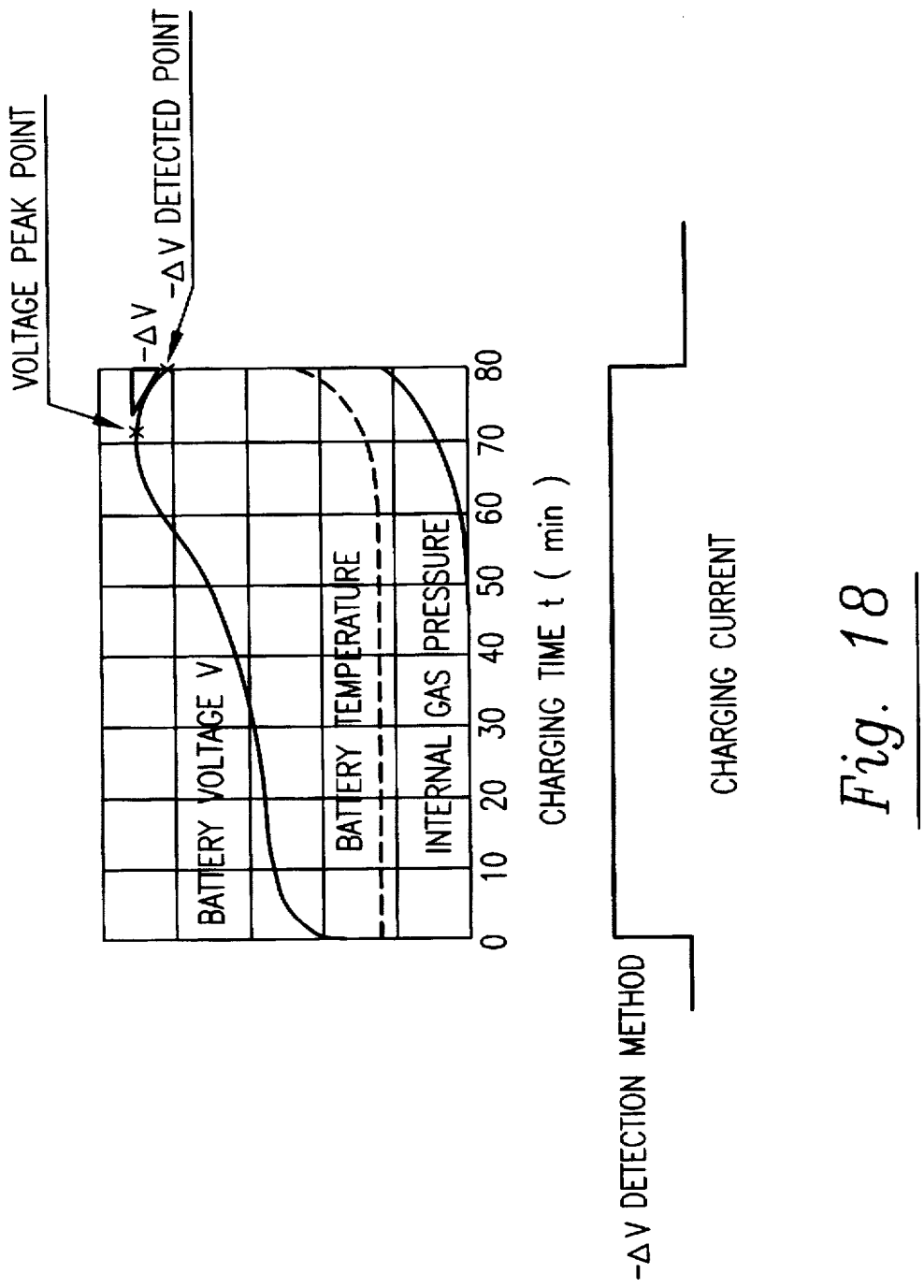
FIG. 18 is a graph showing voltage duration curve examples when a typical conventional method for determining a charging termination time is employed.

FIG. 16 is a flowchart of the operation for the secondary battery charging device according to the embodiment of the present invention that has movable terminals in FIG. 15. As the charging process is begun, first, a check is performed to determine whether manual operation or automatic operation is designated (step S1).

If manual operation is selected, the type and the model of the secondary battery are manually set (step S2).

If automatic operation is selected, the sensors are activated, and acquire required data that concern the secondary battery that is installed in a predetermined location, the electrode interval, polarity, and the voltage (step S3).

The comparator/calculator 34 compares the necessary data that are acquired by the sensors 40 with data that are read from the storage unit 32, and performs calculations (step S4).

Sequentially, a corresponding driving section is activated in consonance with the required data for the secondary battery that are manually set, or data that are obtained by comparison and calculation, and so adjusts the sensor output and the setup data that a difference between the two falls within a permissible range (step S5).

Then, a check is performed to determine whether or not the data that are consonant with the type and the model of the secondary battery have matched the setup (step S6). If not, the driving section continues to be driven and continues the adjustments for the data and the setup data until they match.

When the adjustment is completed and both the data match, charging is begun (step S7). Following this, a check is performed to determine whether or not the charging has been completed (step S8). When the charging has not been completed, program control returns to step S7 and the charging is continued until it is completed.

Whether or not the charging has been completed can be determined by a change in a voltage between the electrodes of the secondary battery and/or a change in the charging current.

When, at step S8, the charging has been completed, the sequential process is terminated.

Taking into consideration the fact that many charging actions for the battery are endothermic reactions, the secondary battery charging method according to the present invention includes a feature whereby a large amount of current is supplied at the beginning of the charging, and primary charging is thereafter performed under conditions wherein a temperature rise is not induced.

Therefore, as charging in a short time is possible and the state of the battery is constantly monitored, an extreme rise in the temperature and overcharging will not occur, and the service life of the battery can be extended.

On the other hand, with the $-\Delta V$ detection system according to the prior art, the rise in the temperature rise can not be avoided at the last stage of the charging. As a result, the internal structure of the battery is adversely affected, and a dry-up phenomenon, the deterioration of an insulating body, or other fatal damage tends to occur.

According to the secondary battery charging method of the present invention, charging can be completed in one third of the time that is required for the conventional charging. Thus, this method is very effective for portable devices.

Further, since the memory effect is not induced, even by relayed charging, in an emergency, the charging of a battery may be temporarily performed for a shorter period than 15 to 20 minute charging time, e.g., for five minutes, and additional charging may be performed later.

The employment of the charging method of the present invention is not limited to compact and portable secondary batteries, and can be employed for large secondary batteries for transportation devices, such as battery powered forklifts and electric carts, and for the power sources of electric cars. For an application for which currently charging must be performed for several hours during a non-operational period, such as during the night, the charging time can also be reduced by a ratio of one to several greater numbers, and thus the method of the present invention apparently shows great merit.

The biggest reasons that electric cars are still in the experimental stage is that suitable light and compact batteries are not yet available, that those batteries that are available have limited capacities and thus long drives with such batteries are difficult, and that the charging time for batteries can not be shortened.

It is anticipated that in the electric car field, etc., where batteries having large capacities are required, alkaline storage batteries will eventually be employed that have superior capacity-to-weight-ratio and capacity-to-volume ratios than conventional lead-acid batteries. The charging method of the present invention provides an effective technique that can be used for the rapid charging of such batteries. Therefore, the charging method of the present invention could be employed for the rapid charging of power supplies for desk lamps, etc.

Since according to the present invention the service life of a battery can be considerably extended, resources can be efficiently used, and the number of batteries that must be disposed of can be reduced, so that the present invention can contribute to the preservation of environment.

With the secondary battery charging device of the present invention that has movable terminals, a single charging device can be employed to charge secondary batteries that differ in size and shape, and voltage and battery capacity. Only one charging device would be required for the charging of, for example, secondary batteries for portable devices that are manufactured differently and that have different system arrangements. When a user in a small entity, such as a user in a home, employs a plurality of systems, he or she would need only one charging device to handle all the systems.

Such advantageous employment would also be possible in situations where there are multiple devices for a plurality of systems that use different batteries, as in companies, etc. For example, in an office where both portable telephones and handy terminals are used, as only one charging device would be required for charging them, and as rapid charging using a high voltage pulse could be performed savings both in time and in expenses could be realized.

Moreover, the secondary battery charging device that has movable terminals can be completely automated, and a condition determination mechanism, such as a means for determining when a coin or a credit card is inserted, can also be provided so that charging will be performed only when a fee is collected or when a certain requirement is met.

With such an arrangement, the charging device could be modified to provide a device that performs charging only when a specific requirement is satisfied, such as the insertion of a predetermined fee or of a credit card.

Such devices could be installed in restaurants, at gas stations, in drive-ins, in bus or train stations, in banks, and in the lobbies of hotels where they would serve as rental charging devices and would provide rapid and easy charging.

Various modes of carrying out the invention are contemplated as being within the scope of the following claims that specifically point out and distinctly claim the subject matter regarded as the invention.

What is claimed is:

1. A second battery charging method comprising the steps of:

applying, to positive and negative terminals of a secondary battery, a voltage pulse having a step shape, whose voltage is reduced as time elapses and in consonance with a characteristic of said secondary battery, and supplying a corresponding current, with said voltage pulse having a pulse height of at least 1.3 times a pulse height of a terminal voltage for said secondary battery;

detecting said terminal voltage of said secondary battery during a pulse halted period and a charging current during a pulse duration;

comparing detected results with standard characteristic data concerning said secondary battery, and making a determination concerning a waveform for said voltage pulse and said pulse duration by employing results obtained from such comparisons;

continuing a charging process in consonance with results obtained by said determination; and performing rapid charging while preventing occurrence of overcharging, overheating, and memory effect in said secondary battery.

2. A secondary battery charging method according to claim 1, wherein said secondary battery is a nickel-cadmium battery, and a characteristic of said voltage pulse is matched with said nickel-cadmium battery.

3. A secondary battery charging method according to claim 1, wherein said secondary battery is a nickel-hydrogen battery, and a characteristic of said voltage pulse is matched with said nickel-hydrogen battery.

4. A secondary battery charging method as in one of claims 1–3, wherein said pulse height of said voltage pulse is so selected as to be 1.5 to 3 times said terminal voltage of said secondary battery.

5. A secondary battery charging device comprising:

a power source for generating a voltage to charge a secondary battery;

a power controller for controlling, upon receipt of said voltage from said power source, a pulse height and a pulse duration of an output voltage pulse in consonance with a control signal from an external source, and for generating said voltage pulse that has a height at least 1.3 times a pulse height of a terminal voltage for said secondary battery;

a monitoring unit for detecting a charging current during a charging period using said voltage pulse and said terminal voltage of said secondary battery during a voltage pulse halted period, and for monitoring a condition of said secondary battery by comparing standard data for characteristics of said secondary battery with said charging current and said terminal voltage that are detected; and a calculation and driving unit for performing, upon receipt of an output by said monitoring unit, a predetermined calculation so as to match said characteristics of said secondary battery, and for driving said power controller in consonance with results obtained by said predetermined calculation.

6. A secondary battery charging device according to claim 5, wherein said monitoring unit and said calculation and driving unit match a characteristic of a nickel-cadmium battery.

7. A secondary battery charging device according to claim 5, wherein said monitoring unit and said calculation and driving unit match a characteristic of a nickel-hydrogen battery.

8. A secondary battery charging device according to claim 5, wherein said monitoring unit and said calculation and driving unit selectively match characteristics of a nickel-cadmium battery, a nickel-hydrogen battery, and other secondary battery.

9. A secondary battery charging method as in one of claims 5-8, wherein said pulse height of said voltage pulse is so selected as to be 1.5 to 3 times said terminal voltage of said secondary battery.

* * * * *